(12) United States Patent
Messerschmidt et al.

(10) Patent No.: US 8,469,600 B2
(45) Date of Patent: Jun. 25, 2013

(54) COMB SIDE PLATE CAGE FOR GUIDING ROLLING BODIES IN A ROLLING BODY BEARING AND ROLLING BODY BEARING

(75) Inventors: Rainer Messerschmidt, Duesseldorf (DE); Edgar Karbach, Wuppertal (DE); Henri Van Der Knokke, Niederwerrn (DE); Stefan Hierl, Berg (DE); Bruno Scherb, Cadolzburg (DE); Rainer Gebauer, Bamberg (DE); Herbert Roth, Schweinfurt (DE); Rainer Schroeder, Egenhausen (DE); Rudolf Zeidlhack, Essleben (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 931 days.

(21) Appl. No.: 12/523,251

(22) PCT Filed: Dec. 19, 2007

(86) PCT No.: PCT/DE2007/002291
§ 371 (c)(1),
(2), (4) Date: Oct. 7, 2009

(87) PCT Pub. No.: WO2008/086764
PCT Pub. Date: Jul. 24, 2008

(65) Prior Publication Data
US 2010/0215297 A1    Aug. 26, 2010

(30) Foreign Application Priority Data

Jan. 16, 2007 (DE) .......... 10 2007 002 360

(51) Int. Cl.
*F16C 33/41* (2006.01)
*F16C 33/46* (2006.01)

(52) U.S. Cl.
USPC .................................. 384/572; 384/579

(58) Field of Classification Search
USPC .................................. 384/572–580
See application file for complete search history.

(56) References Cited

U.S. PATENT DOCUMENTS

| | | | | |
|---|---|---|---|---|
| 1,202,576 A | * | 10/1916 | Perkins | 384/579 |
| 2,063,587 A | * | 12/1936 | Cox | 384/579 |
| 3,382,016 A | * | 5/1968 | Heinrich | 384/575 |
| 3,586,406 A | * | 6/1971 | Barr | 384/580 |
| 6,988,833 B1 | * | 1/2006 | Docimo | 384/578 |

FOREIGN PATENT DOCUMENTS

| | | |
|---|---|---|
| CH | 322 003 A | 5/1957 |
| DE | 858 912 A | 12/1952 |
| DE | 66 06 962 A | 12/1970 |
| DE | 15 75 480 A | 4/1972 |
| DE | 42 27 662 | 2/1994 |
| GB | 959 948 | 6/1964 |
| GB | 2 310 009 A | 8/1997 |

* cited by examiner

*Primary Examiner* — Phillip A Johnson
(74) *Attorney, Agent, or Firm* — Lucas & Mercanti, LLP

(57) ABSTRACT

A roller bearing cage for guiding rolling bodies in a rolling body bearing, which has multiple rolling bodies, two cage side elements, between which the rolling bodies are arranged, and which have multiple web appendages to guide the rolling bodies, and multiple connection elements that connect the two cage side elements. The azimuthal position of the connection elements defines a connection area. Exactly one connection element and at least one web appendage are arranged in a connection. The connection element and web appendage are arranged in sections inside a radial interior of the respective cage side elements, the border of which is defined by the positions of the rotation axes of the rolling bodies.

15 Claims, 3 Drawing Sheets

Figure 1:
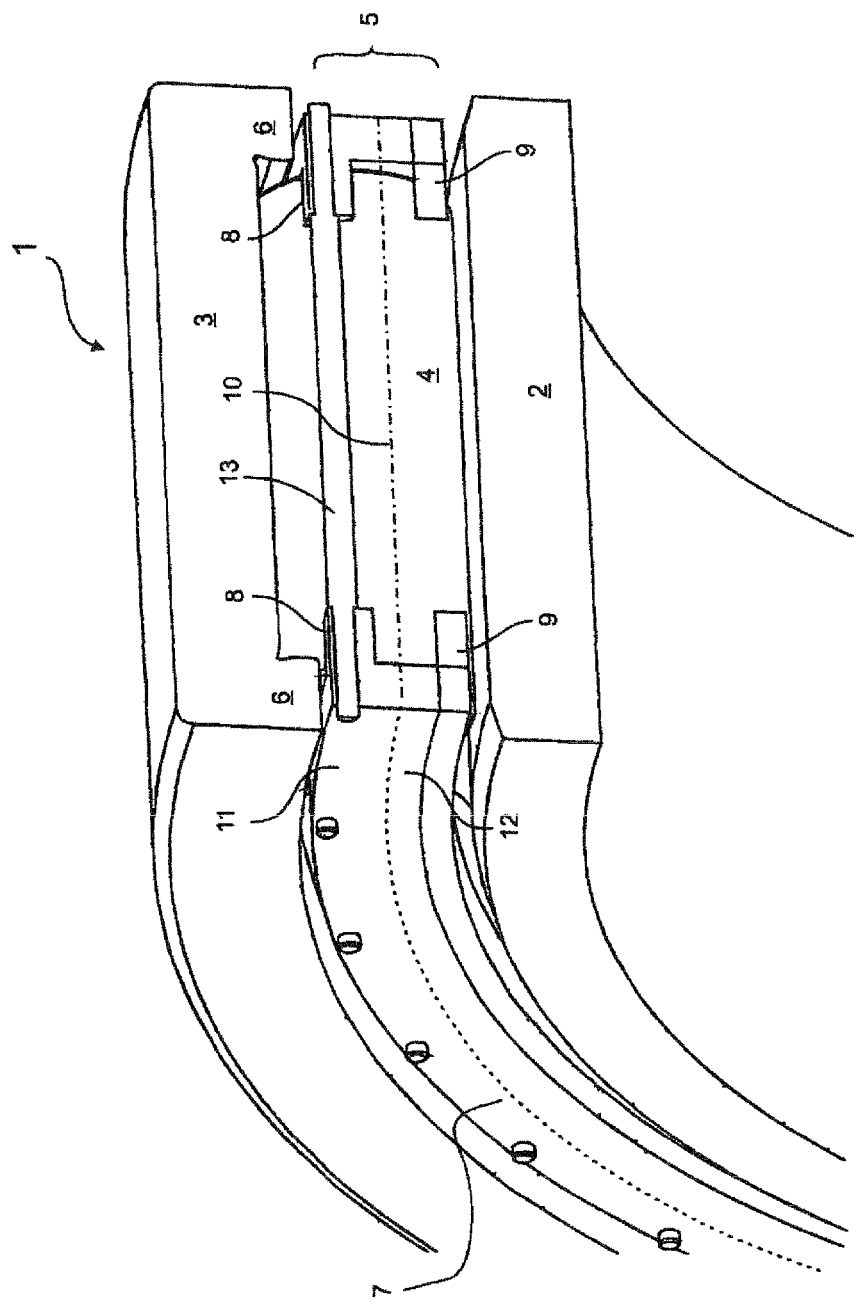

COMB SIDE PLATE CAGE FOR GUIDING ROLLING BODIES IN A ROLLING BODY BEARING AND ROLLING BODY BEARING

This application is a 371 of PCT/DE2007/002291 filed Dec. 19, 2007, which in turn claims the priority of DE 10 2007 002 360.1 filed Jan. 16, 2007 the priority of both applications is hereby claimed and both applications are incorporated by reference herein.

FIELD OF THE INVENTION

The invention relates to a comb side plate cage for guiding rolling bodies in a rolling body bearing and to a rolling body bearing having the comb side plate cage.

Rolling body bearings are generally composed of an external ring, an internal ring and a plurality of rolling bodies which are often held in a rolling body cage between the external ring and the internal ring. The rolling body cage is used here, in particular, to separate the rolling bodies from one another and to hold the rolling bodies at a uniform distance from one another.

Document DE 100 31 427 C2 deals with large rolling bearings which are used, for example, in rolling mills and which have what are referred to as bolt cages. The bolt cage is composed of two cage plates which are arranged parallel to one another and which are connected to one another by a plurality of bolts, with each bolt supporting a rolling body, for example a cylinder roller. In order to receive the bolts, the rolling bodies each have a central bore. The bolts are usually provided at one end with a thread which is screwed into a cage plate. After the cage has been mounted in the rolling bearing with the rolling bodies inserted, the other end of the bolt is permanently welded to the other cage plate.

Document DE 42 27 662 A1, which arguably describes the closest prior art, discloses a radial rolling bearing which has a cage which is composed of two annular rings which have recesses forming pockets on their sides which face one another, in which case the recesses are separated from one another by web shoulders, and the annular rings are held at a distance from one another and are connected to one another by connecting elements running between the rolling bodies. In order to increase the stability of the cage, the annular rings are connected to one another between each rolling body by means of two connecting elements which are located one on top of the other in the radial direction.

The invention is based on the object of proposing a new cage design which ensures that the cage is configured in a way which is suitable for loading, and even for severe stresses.

According to the invention, a comb side plate cage for guiding or receiving rolling bodies in a rolling body bearing is proposed. The rolling body bearing is embodied in any desired design, preferably as a radial rolling bearing, in particular as a tapered rolling bearing or as a cylinder rolling bearing.

The comb side plate cage has the function of separating from one another the rolling bodies which are mounted or arranged therein, of holding them at a uniform distance from one another, of preventing the rolling bodies from falling out and/or of guiding the rolling bodies in the zone of the rolling body bearing which is not subjected to loading.

For this purpose, the comb side plate cage has two cage side plates which are preferably embodied in an annular plate shape or annular ring shape, and between which the rolling bodies are arranged at least in sections. In order, in particular, to guide the rolling bodies on the edge side or end side, the cage side plates have a plurality of web shoulders, which are respectively positioned one opposite the other on the side of the cage side plates which faces the rolling bodies.

The web shoulders are preferably embodied as shoulders which are stump-like and/or wedge-like in cross section and have a concave contour on the sides or edges facing the rolling bodies, which contour is adapted to the external contour of the rolling bodies and guides the latter at least intermittent. The length of the web shoulders in the axial direction is respectively preferably less than a third of the distance between the two cage side plates, in particular less than a quarter. The web shoulders are preferably distributed evenly in the circumferential direction and/or azimuthally, with the result that the cage side plates are embodied in a comb-like fashion.

The comb side plate cage has a plurality of connecting elements which are designed and/or arranged so as to connect the two cage side plates and hold them at a distance from one another. For the purpose of definition, the region which extends in the radial direction between the rolling bodies, and/or the gap region which extends between the rolling bodies and in which a connecting element is arranged, is referred to as the connecting region. The connecting elements are arranged outside, in particular between the rolling bodies, here.

According to the invention, it is proposed that precisely one connecting element and/or at least one web shoulder is arranged in at least one connecting region, wherein said connecting element and/or said web shoulder are arranged at least in sections inside a radial internal region of the respective cage side plate, and the boundary of said connecting element or web shoulder is defined by the positions of the rotational axes of the rolling bodies. The position of the connecting elements or of the web shoulders is therefore set with respect to the (virtual) penetration point of the rolling body rotational axis through the respective cage side plate. In other words, the radial internal region on each cage side plate is bounded by a circle with a radius which corresponds to the distance between the center point of the cage side plate and the abovementioned penetration point.

With this new design of cage it is possible to construct a rolling body bearing in a way which is suitable for the loading in various applications.

In one structurally advantageous design, the connecting elements are embodied as bolts. In particular, the bolts are embodied with a tapering end section at both ends, with the result that a shoulder, which bears against the cage side plates and/or the web shoulders and therefore ensures a predetermined distance between the cage side plates, is formed on both sides.

In one possible embodiment alternative, in the at least one connecting region, the connecting element is arranged completely inside the radial internal region, and the at least one web shoulder is, in particular, arranged completely outside the radial internal region. In this way, the stability of the comb side plate cage is generated by the connecting elements which lie radially further towards the inside, while the guidance is implemented by the web shoulders which lie radially further towards the outside.

In a further embodiment alternative, the web shoulder and connecting element are arranged in inverted fashion with respect to the preceding alternative, with the result that the at least one web shoulder is arranged inside the radial internal region, and the connecting element is arranged completely outside the radial internal region. In this case, the guidance of the rolling bodies is ensured by the web shoulders which lie radially further towards the inside, and this is advantageous, in particular, in the case of rolling body bearings which have rims on the external running ring or external ring.

In a further embodiment alternative, both the web shoulder and the connecting element of a connecting region are arranged inside the radial internal region, with the result that, for example, the comb side plate cage can be equipped with rolling bodies from radially outside in the already mounted state.

In one particularly advantageous and stable embodiment of the invention, the integrally formed connecting element on each cage side plate is secured to at least two receptacle devices which are separated from one another. The receptacle devices preferably lie one on top of the other, or overlap at least partially, in the radial direction.

In one preferred development, one of the receptacle mounts is arranged radially outside the radial internal region, and one of the receptacle devices is arranged radially inside the radial internal region. In this inventive development, increased cage stability is achieved compared to individual bolts, while, in addition, only a reduced degree of mounting effort has to be applied compared to mounting two separate bolts lying one on top of the other.

In addition it is preferred if one of the receptacle mounts is arranged in the at least one web shoulder. In this way, the connecting element is secured in a reinforced region of the comb side plate, and this contributes again to increasing the stability of the comb side plate cage.

In one particularly preferred embodiment, which is also cost effective to manufacture, the receptacle mounts are embodied as through bores or blind holes in or through which the connecting elements are plugged or led. Generally, the connection of the cage side plates to the connecting elements can be made using any desired connecting techniques, with welding, riveting, screwing or bonding being preferred.

A particularly successful embodiment is in the form of a connecting element which is embodied as a double bolt with a bridge region of integral design. The connecting element therefore has an H-shaped structure in which the bridge region is preferably arranged in the center. The connection between the bridge region and the bolt or bolt sections of the double bolt can be embodied in a positively locking, materially joined or frictionally locking fashion. The connecting element is preferably fabricated from metal. In one possible alternative, only the bolts or bolt sections are constructed from metal, while the bridge region is constructed from plastic. In another alternative, the connecting element is composed completely of plastic.

In one preferred development, the bridge region has, on the side faces which face the rolling bodies, guide faces which are concave on both sides and which assist the guidance of the rolling bodies with respect to one another and the holding of the rolling bodies at a distance from one another.

In particular in the case of an H-shaped construction of the connecting element, it is sufficient if only every second, third or fourth intermediate region between the rolling bodies is embodied as a connecting region. At the same time, the equipping of the comb side plate cage with the rolling bodies is made easier or even made at all possible in the first place.

A further subject matter of the invention concerns a rolling body bearing, in particular radial rolling bearing, having a comb side plate cage as claimed in one of the preceding claims or as has been described above, with the rolling body bearing being embodied as a large bearing or large rolling bearing, jointly referred to below as large bearings. A large bearing is preferably defined as a rolling body bearing with an external diameter of more than 300 millimeters, preferably more than 420 millimeters, in particular more than 1000 mm.

In one preferred embodiment, the rolling body bearing has a plurality of rolling bodies which are embodied without a through bore and/or are constructed from rolling bearing steel. As mentioned in the introduction, the bolt cages which have been used and known hitherto have rolling bodies with through bores which are designed to receive the bolts. The need for these through bores means that the rolling bodies have to be fabricated from case-hardened steel for reasons of strength, and this entails increased fabrication costs. As a result of the use of the comb side plate cage according to the invention, the need for through bores is eliminated, with the result that the less expensive rolling bearing steels can be used for the rolling bodies.

In a further preferred embodiment, the comb side plate cage is installed as a premounted unit, with or without premounted rolling bodies, in the rolling body bearing. In contrast to the previously used bolt cages which are assembled and welded in the completely mounted rolling body bearing, which can lead to soiling with cinders and weld beads and to distortion of the cage, the comb side plate cage is preferably already completely assembled before insertion into the rolling body bearing, with the result that a premounted unit is installed in the rolling body bearing, in particular without said rolling body bearing being adversely affected by the mounting process or soiled by emissions. Whether the rolling bodies or rollers are already installed in the rolling body bearing, in particular in the rings of the rolling body bearing, before the insertion of the comb side plate cage, or afterwards, depends in particular on the rims which are present on the external ring or internal ring of the rolling body bearing.

In one specific embodiment, at least one ring, in particular an internal ring or an external ring, has, in particular, screwable rims.

Figure 2:
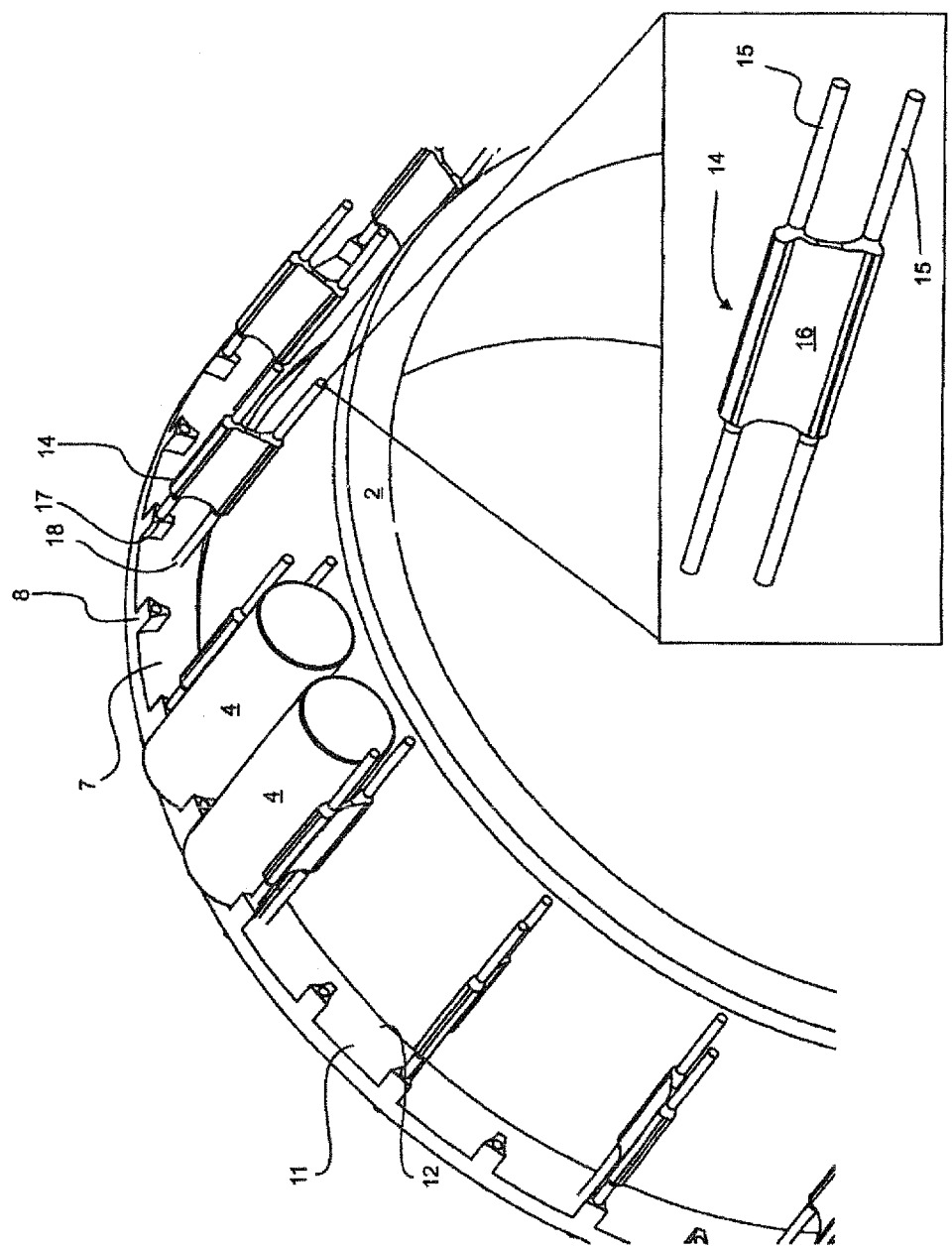
Figure 3:
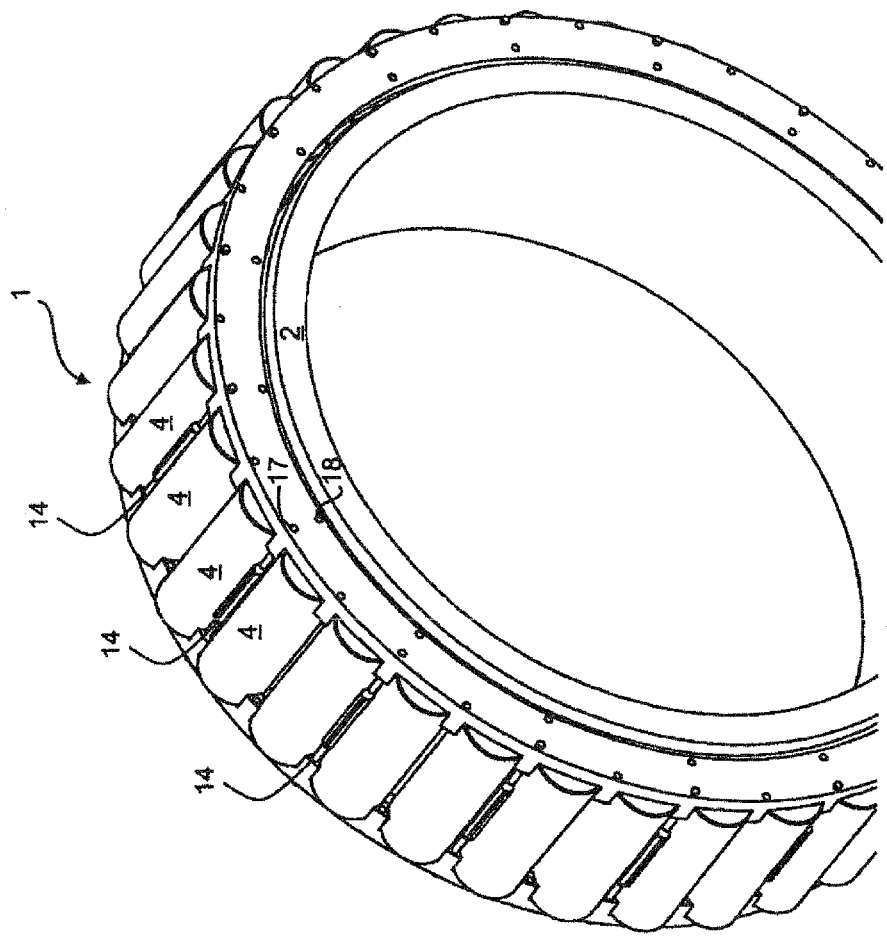

Further advantages, features and effects of the invention result from the following description of preferred exemplary embodiments of the invention and from the appended figures, of which:

FIG. 1 is a schematic, three-dimensional sectional illustration of a cylinder rolling bearing as a first exemplary embodiment of the invention in a sectional plane parallel to the axial extent of the cylinder rolling bearing;

FIG. 2 is a schematic, three-dimensional illustration of a second exemplary embodiment of the invention in the form of a second cylinder rolling bearing in a radial plan view with the external ring and to a certain extent the rolling body being omitted from the drawing; and FIG. 3 is a schematic, three-dimensional illustration of the cylinder rolling bearing in FIG. 2, fully equipped with rolling bearings, and likewise with the external ring omitted from the drawing.

Corresponding or identical parts are respectively provided with the corresponding or identical reference symbols in the following figures.

FIG. 1 shows a cylinder rolling bearing 1 in a schematic, three-dimensional sectional illustration as a first exemplary embodiment of the invention. The cylinder rolling bearing 1 comprises an internal ring 2, an external ring 3 between which a plurality of cylinder rollers 4 are mounted in such a way that they can roll in a comb side plate cage 5, with the result that the external ring 3 can rotate relative to the internal ring 2 in a known fashion.

The internal ring 2 is embodied without rims, while the external ring 3 has lateral, radially inwardly directed rims 6 which are designed such that they are optionally integrally formed onto the external ring 3 or can be screwed thereto.

The comb side plate cage 5 has two cage side plates 7 which are arranged laterally with respect to one another, are aligned in parallel and are positioned at the end sides of the cylinder rollers 4.

In a possible first alternative which is illustrated in FIG. 1, each cage side plate 7 has an external stump 8 and an internal stump 9 for each interspace between the cylinder rollers 4. The stumps 8 and 9 are, for example, integrally formed onto the respective cage side plate 7. In the axial direction, the stumps 8 and 9 extend so far that they each engage around approximately one quarter of the cylinder rollers 4 at the ends. The stumps 8 and 9 form pockets lying opposite one another on each side of the two cage side plates 7, the ends of the cylinder rollers 4 being arranged and/or mounted in said pockets. In one possible alternative embodiment, that side face of the stump 8 or 9 which respectively faces the cylinder rollers 4 is adapted to the shape of the cylinder rollers 4, that is to say is of concave design. In another possible embodiment alternative, the side faces which face the cylinder rollers 4 are implemented in a planar fashion.

The roller axis of the cylinder roller 4 which is at the front in the illustration in FIG. 1, is indicated by a dashed line 10. A radius for a circle which divides each cage side plate 7 into a radially external region 11 and into a radially internal region 12 is defined by the virtual penetration point of the roller axis 10 through the cage side plates 7.

The stumps 8 and 9 are distributed in such a way that in each case the external stump 8 is arranged in the radially external region 11, and the internal stump 9 is respectively arranged in the radially internal region 12.

In order to stabilize the comb side plate cage 5, the latter comprises a plurality of connecting elements which are embodied as bolts 13, with in each case precisely one bolt 13 being arranged in an intermediate region between two cylinder rollers 4. The bolts 13 have a reduced diameter at their free ends with respect to their center part, with the result that shoulder faces are produced which bear on the bore opening of a bore formed in the stumps 8, and ensure stable cohesion of the comb side plate cage 5.

In summary, this first embodiment alternative has, per interspace or connecting region, one internal stump 8 and one external stump 9 as well as a bolt 13 which is arranged in the radially external region 12.

In a further embodiment alternative, the bolt 13 is not arranged in the radially external region 11 but instead in the radially internal region 12, with the bolt 13 being led through the internal stump 9 and/or secured thereby in an analogous fashion. This further embodiment alternative therefore has, per interspace or connecting region, one internal stump and one external stump 8 or 9, respectively, and a bolt 13 which is arranged in the radially internal region 12.

In a further embodiment alternative, per interspace or connecting region an internal stump 9 and a bolt 13 which is arranged in the radially external region 11 are respectively provided on both sides, with the external stump 8 being dispensed with. This embodiment permits easier assembly of the comb side plate cage 5.

In a further embodiment alternative, the comb side plate cage 5 has on both sides respectively an external stump 8 and a bolt 13 which is arranged in the radially internal region 12. In this embodiment alternative, the internal stump 9 has been dispensed with.

FIG. 2 shows a second exemplary embodiment of the invention in a three-dimensional illustration of a second cylinder rolling bearing 1 viewed radially obliquely from above. In order to improve clarity, the external ring 3 has been omitted from the drawing, and only two rolling bodies 4 have been illustrated. The cylinder rolling bearing in FIG. 1 is of analogous design to the cylinder rolling bearing 1 in FIG. 1, with the difference that, instead of the bolts 13, H-shaped connecting elements 14 are provided and they connect the cage side plates 7 to one another, only one of said cage side plates 7 being illustrated here.

The connecting element 14 is illustrated once more in a view of a detail in the image region bottom right in FIG. 2. The connecting element 14 is embodied as a double bolt structure which has two bolts 15 which are arranged parallel to one another and are integrally connected to one another by means of a center part 16. The bolts 15 which are illustrated in FIG. 2 have a uniform, round diameter over their entire longitudinal extent, and in modified embodiments they can also have tapered end sections, with the result that, in a way which is analogous to the bolts 13 in FIG. 1, shoulder regions are formed in order to ensure a defined distance between the cage side plates 7. The center part 16 has, on both sides, a concavely curved side face, which faces the cylinder rollers 4 and is adapted to the curvature of the cylinder rollers 4. In modified embodiments, the center region 16, which is shown in the center in FIG. 2, is arranged offset with respect to the cage side plates 7 or is split up into a plurality of segments, with the result that oil circulation or grease circulation in the cylinder rolling bearing 1 is improved. In the installed state, the bolts 15 are arranged congruently or at least overlapping in the radial direction.

The radially external bolt 15 is led through a first through bore 17 through the external stump 8, with the radially internal bolt 15 being secured in a second through bore 18 by the cage side plates 7.

By definition, the cage side plates 7 in FIG. 2 can also be divided in analogous fashion to FIG. 1 into a radially external region 11 and a radially internal region 12, with the external stump 8 or the first through bore 17 being arranged in the radially external region 11, and the second through bore 18 being arranged in the radially internal region 12, with the result that the connecting element 14 is arranged and/or secured and/or attached at least in part or in sections within the radially internal region 12.

In alternative embodiments, internal stumps 9 can be provided as an alternative to, or in addition to, the external stumps 8.

FIG. 3 shows the cylinder rolling bearing 1 in FIG. 2, equipped completely with cylinder rollers 4. As is apparent from the illustration in FIG. 3, a connecting element 14 is arranged only in every second interspace between the cylinder rollers 4. This is possible because, owing to the stabilization by the center part 16, sufficient stability is provided even in the case of a comb side plate cage 5 which is intermittently fitted with connecting elements 14. In addition, the intermittent fitting provides sufficient space for mounting the rollers.

The embodiment alternatives of comb side plate cages 5 which are shown and described in FIGS. 1 to 3 can also be used in an analogous fashion for tapered rolling bearings, after appropriate adaptation.

The comb side plate cage 5 can already be in the premounted state when it is installed in the cylinder rolling bearing 1; in particular there is no need for any fabrication steps to be carried out within the cylinder rolling bearing 1 which are susceptible to soiling. The cylinder rolling bearings 1 which are shown in FIGS. 1 to 3 are optionally embodied as large bearings which have an external diameter of over 300 mm. The material of the cylinder rollers 3 is a customary one.

LIST OF REFERENCE NUMERALS

1 Cylinder Rolling Bearing
2 Internal Ring
3 External Ring
4 Cylinder Rollers

5 Comb Side Plate Cage
6 Rims
7 Side Plates
8 Radially External Stump
9 Radially Internal Stump
10 Rotational Axis
11 Radially External Region
12 Radially Internal Region
13 Bolt
14 Connecting Element
15 Bolt
16 Center Part
17 First Through Bore
18 Second Through Bore

The invention claimed is:

1. A comb side plate cage for guiding rolling bodies in a rolling body bearing, comprising:
a plurality of rolling bodies;
two cage side plates, between which the rolling bodies are arranged, having a plurality of web shoulders guiding the rolling bodies; and
a plurality of connecting elements connecting the two cage side plates whose positions define connecting regions,
wherein one of the connecting elements and at least one of the web shoulders are arranged in at least one of the connecting regions,
wherein the at least one of the web shoulders is arranged, at least partially, inside a radial internal region of the cage side plates, the connecting elements are arranged on one of an inside and outside of the radial internal region of the cage side plates, and a boundary of the radial internal region is defined by positions of rotational axes of the rolling bodies wherein, in at least one of the connecting regions, the at least one of the web shoulders is arranged inside the radial internal region, and the connecting elements are arranged outside the radial internal region.

2. The comb side plate cage as claimed in claim 1, wherein the connecting elements are bolts.

3. The comb side plate cage as claimed in claim 1, wherein, in at least one of the connecting regions, the connecting elements are arranged completely inside the radial internal region, and another of the at least one of the web shoulders is arranged outside the radial internal region.

4. The comb side plate cage as claimed in claim 1, wherein the connecting elements on each cage side plate are secured to at least two receptacle attachments which are separated from one another.

5. The comb side plate cage as claimed in claim 4, wherein the receptacle attachments are through bores.

6. The comb side plate cage as claimed in claim 1, wherein only every second intermediate region between the rolling bodies is a connecting region.

7. A radial rolling bearing, having the comb side plate cage, as claimed in claim 1, wherein the radial rolling bearing is a large bearing having an external diameter of greater than 300 millimeters.

8. The radial rolling bearing as claimed in claim 7, wherein the rolling bodies are lacking a through bore and are constructed from rolling bearing steel.

9. The radial rolling bearing as claimed in claim 7, wherein the comb side plate cage is used as a premounted unit in the rolling body bearing.

10. The comb side plate cage for guiding rolling bodies in a rolling body bearing, comprising:
a plurality of rolling bodies;
two cage side plates, between which the rolling bodies are arranged, having a plurality of web shoulders guiding the rolling bodies; and
a plurality of connecting elements connecting the two cage side plates whose positions define connecting regions,
wherein one of the connecting elements and at least one of the web shoulders are arranged in at least one of the connecting regions,
wherein one of the connecting elements and the web shoulders are arranged, at least partially, inside a radial internal region of the cage side plates, and a boundary of the radial internal region is defined by positions of rotational axes of the rolling bodies,
wherein the connecting elements on each cage side plate are secured to at least two receptacle attachments which are separated from one another, and
wherein the connecting elements are double bolts with a bridge region of integral design.

11. The comb side plate cage as claimed in claim 10, wherein one of the receptacle attachments is arranged outside the radial internal region, and one of the receptacle devices is arranged inside the radial internal region.

12. The comb side plate cage as claimed in claim 10, wherein one of the receptacle attachments is arranged in one of the web shoulders.

13. The comb side plate cage as claimed in claim 10, wherein the bridge region has guide faces, concave on each side, for the rolling bodies.

14. The comb side plate cage as claimed in claim 10, wherein only every second intermediate region between the rolling bodies is a connecting region.

15. A comb side plate cage for guiding rolling bodies in a rolling body bearing, comprising: a plurality of rolling bodies; two cage side plates, between which the rolling bodies are arranged, having a plurality of web shoulders guiding the rolling bodies; and a plurality of connecting elements connecting the two cage side plates whose positions define connecting regions, wherein one of the connecting elements and at least one of the web shoulders are arranged in at least one of the connecting regions, wherein the at least one of the web shoulders is arranged, at least partially, inside a radial internal region of the cage side plates, the connecting elements are arranged on one of an inside and outside of the radial internal region of the cage side plates, and a boundary of the radial region is defined by positions of rotational axes of the rolling bodies, wherein, in at least one of the connecting regions, the at least one of the web shoulders and the connecting elements are arranged inside the radial internal region.

* * * * *

UNITED STATES PATENT AND TRADEMARK OFFICE
CERTIFICATE OF CORRECTION

PATENT NO. : 8,469,600 B2  Page 1 of 1
APPLICATION NO. : 12/523251
DATED : June 25, 2013
INVENTOR(S) : Messerschmidt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this
Eighth Day of September, 2015

Michelle K. Lee
*Director of the United States Patent and Trademark Office*